US011816972B2

(12) United States Patent
Xing et al.

(10) Patent No.: US 11,816,972 B2
(45) Date of Patent: Nov. 14, 2023

(54) SAFETY MANAGEMENT METHOD FOR WELL SITE PERSON, SAFETY MANAGEMENT SYSTEM, AND STORAGE MEDIUM

(71) Applicant: YANTAI JEREH PETROLEUM EQUIPMENT & TECHNOLOGIES CO., LTD., Yantai (CN)

(72) Inventors: Haiping Xing, Yantai (CN); Hao Yang, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/964,622

(22) Filed: Oct. 12, 2022

(65) Prior Publication Data

US 2023/0036118 A1 Feb. 2, 2023

Related U.S. Application Data

(63) Continuation of application No. PCT/CN2022/098890, filed on Jun. 15, 2022.

(30) Foreign Application Priority Data

Jun. 25, 2021 (CN) .......................... 202110713299.5

(51) Int. Cl.
*G08B 21/22* (2006.01)
*G08B 21/18* (2006.01)
(Continued)

(52) U.S. Cl.
CPC ........... *G08B 21/22* (2013.01); *G08B 21/182* (2013.01); *G08B 25/10* (2013.01); *G08B 27/005* (2013.01)

(58) Field of Classification Search
CPC ...... G08B 21/22; G08B 21/182; G08B 25/10; G08B 25/16; G08B 7/066;
(Continued)

(56) References Cited

U.S. PATENT DOCUMENTS

2006/0232259 A1* 10/2006 Olsson ..................... G01V 3/15
324/67
2008/0150751 A1* 6/2008 Sala ......................... G01D 4/00
340/870.02
(Continued)

FOREIGN PATENT DOCUMENTS

| CN | 103016060 A | 4/2013 |
| CN | 103116963 A | 5/2013 |

(Continued)

OTHER PUBLICATIONS

Written Opinion and International Search Report for PCT Application No. PCT/CN2022/098890 dated Sep. 14, 2022.
(Continued)

*Primary Examiner* — Ojiako K Nwugo

(57) ABSTRACT

A safety management method for well site worker, a safety management system for well site worker and a storage medium are disclosed. The safety management method for well site worker includes acquiring position information of the well site worker; acquiring layout information of a well site, the layout information including position information of a safe region, a dangerous region, and a buffer region between the safe region and the dangerous region in the well site; and in response to the well site worker being located in the buffer region or the dangerous region, sending an alarm signal to warn the well site worker to stay away from the dangerous region.

20 Claims, 6 Drawing Sheets

(51) Int. Cl.
  *G08B 25/10* (2006.01)
  *G08B 27/00* (2006.01)
(58) Field of Classification Search
  CPC ............. G08B 721/0423; G06Q 50/02; G06Q
         10/103; G06Q 10/0635; E21F 11/00
  See application file for complete search history.

(56) References Cited

U.S. PATENT DOCUMENTS

| | | | | |
|---|---|---|---|---|
| 2014/0031082 | A1* | 1/2014 | Zishaan | G08B 21/14 |
| | | | | 455/556.1 |
| 2015/0363738 | A1* | 12/2015 | Haci | G06Q 10/063114 |
| | | | | 705/7.15 |
| 2017/0140637 | A1* | 5/2017 | Thurlow | G08B 21/182 |
| 2017/0303187 | A1* | 10/2017 | Crouthamel | H04W 52/0235 |
| 2017/0352242 | A1* | 12/2017 | Glynn | G08B 21/0469 |
| 2018/0164350 | A1* | 6/2018 | Thompson | G01R 19/155 |
| 2020/0193341 | A1* | 6/2020 | Barak | G06Q 10/063114 |
| 2020/0383172 | A1* | 12/2020 | McCracken | H04W 88/06 |
| 2021/0158207 | A1* | 5/2021 | Alsahlawi | G06Q 10/0639 |
| 2021/0176601 | A1* | 6/2021 | Alsahlawi | G06Q 50/08 |
| 2021/0264764 | A1* | 8/2021 | Glynn | G08B 25/016 |

FOREIGN PATENT DOCUMENTS

| | | |
|---|---|---|
| CN | 202954853 U | 5/2013 |
| CN | 103136908 A | 6/2013 |
| CN | 108615204 A | 10/2018 |
| CN | 110490430 A | 11/2019 |
| CN | 110889941 A | 3/2020 |
| CN | 111083640 A | 4/2020 |
| CN | 111145479 A | 5/2020 |
| CN | 111615059 A | 9/2020 |
| CN | 112489393 A | 3/2021 |
| CN | 113409019 A | 9/2021 |

OTHER PUBLICATIONS

First Search for Chinese Application No. 202110713299.5 dated Aug. 26, 2022.

* cited by examiner

SAFETY MANAGEMENT METHOD FOR WELL SITE PERSON, SAFETY MANAGEMENT SYSTEM, AND STORAGE MEDIUM

CROSS-REFERENCE TO RELATED APPLICATION

This application is a continuation of International Patent Application No. PCT/CN2022/098890, filed on Jun. 15, 2022, which claims priority to Chinese Patent Application No. 202110713299.5, filed on Jun. 25, 2021. All the aforementioned patent applications are hereby incorporated by reference in the entirety.

TECHNICAL FIELD

The embodiments of the present disclosure relate to a safety management method, a safety management system, and a storage medium for well site worker.

BACKGROUND

A well site is a site, composed of a wellhead and other ground mechanical equipment, for exploiting underground oil, natural gas, and other resources. According to the oil production method, the well site can be divided into: (1) flowing oil production well site, which relies on the pressure of the underground oil layer, so that the crude oil continuously surges from the bottom of the well to the wellhead, and flows to the metering station through the wellhead facilities, the ground equipment mainly includes christmas trees, water jacket heater, and oil-gas separator, etc.; (2) mechanical oil production well site, which is a well site that adopts mechanical methods to produce oil under the condition of low underground pressure and lack of self-flowing ability of oil wells. For example, the construction operation project of oil and gas field well site has the characteristics of complex process, many cross operations, large construction span, and many cooperative units.

SUMMARY

At least one embodiment of the present disclosure discloses a safety management method for well site worker, which includes: acquiring position information of a well site worker; acquiring layout information of a well site, wherein the layout information includes position information of a safe region, a dangerous region, and a buffer region between the safe region and the dangerous region in the well site; and in response to the well site worker being located in the buffer region or the dangerous region, sending an alarm signal to warn the well site worker to stay away from the dangerous region.

For example, the safety management method for well site worker provided by at least one embodiment of the present disclosure further includes: acquiring a moving speed of the well site worker toward the dangerous region; judging whether the moving speed is greater than a preset threshold; and in response to the moving speed being greater than the preset threshold, sending the alarm signal to the well site worker.

For example, the safety management method for well site worker provided by at least one embodiment of the present disclosure further includes: acquiring profile information of the well site worker, wherein the profile information of the well site worker includes authority information of the well site worker; determining, based on the authority information of the well site worker, whether the alarm signal is triggered when the well site worker is located in the buffer region or the dangerous region; and triggering the alarm signal when the well site worker is located in the buffer region or the dangerous region in response to the well site worker not having an authority to enter the dangerous region.

For example, in the safety management method for well site worker provided by at least one embodiment of the present disclosure, in response to the well site worker being located in the dangerous region and having no authority to trigger the alarm signal, the method further includes: planning a route for the well site worker to evacuate the dangerous region according to the position information of the well site worker and the layout information of the well site.

For example, in the safety management method for well site worker provided by at least one embodiment of the present disclosure, the layout information further includes functional partitioning, safety management level partitioning, a count of positioning base stations, and installation positions of the positioning base stations of the well site; the method further includes: determining the position information of the safety region, the dangerous region, and the buffer region of the well site according to the functional partitioning and the safety management level partitioning of the well site.

For example, the safety management method for well site worker provided by at least one embodiment of the present disclosure further includes: acquiring a duration when the well site worker is at a same position and a count of well site workers located at the same position; performing timeout monitoring and motionless monitoring on the well site worker based on the duration when the well site worker is at the same position; and performing crowd monitoring on the well site worker based on the count of well site workers located at the same position, so as to achieve real-time monitoring of the well site worker.

For example, the safety management method for well site worker provided by at least one embodiment of the present disclosure further includes: receiving alarm information sent by the well site worker, and judging a dangerous situation according to the alarm information, so as to send a rescue prompt signal to implement a corresponding rescue operation.

For example, the safety management method for well site worker provided by at least one embodiment of the present disclosure further includes: acquiring activity trajectory data of the well site worker, so as to perform statistics and query on a behavior of the well site worker.

At least one embodiment of that present disclosure also provides a safety management system for well site worker, including: a positioning tag, a positioning base station, a server, a data management platform, and a terminal device; the positioning tag is worn by the well site worker and is configured to transmit position information of the well site worker to the positioning base station, wherein the positioning tag includes an alarm unit; the positioning base station is configured to transmit the received position information of the well site worker to the server, and transmit an instruction sent by the server to the positioning tag, so as to achieve data communication between the positioning tag and the server; the server is configured to acquire the position information of the well site worker and layout information of a well site, wherein the layout information includes position information of a safe region, a dangerous region, and a buffer region between the safe region and the dangerous region in the well site; and to send, in response to the well site worker being located in the buffer region or the dangerous region, an alarm instruction to the positioning tag to instruct the alarm unit of the positioning tag to issue an alarm signal to warn the well site worker to stay away from the dangerous region; the data management platform is configured to store the layout information of the well site and acquire and store activity trajectory data of the well site worker from the server; and the terminal device is configured to monitor and query activity trajectory of the well site worker based on the activity trajectory data of the well site worker stored in the data management platform.

For example, in the safety management system for well site worker provided by at least one embodiment of the present disclosure, the data management platform is further configured to store profile information of the well site worker, wherein the positioning tag is in one-to-one correspondence with the profile information of the well site worker.

For example, in the safety management system for well site worker provided by at least one embodiment of the present disclosure, the positioning base station is installed on an edge of the well site or an edge of an operation region in the well site, the operation region in the well site includes the safety region.

For example, in the safety management system for well site worker provided by at least one embodiment of the present disclosure, the server is further configured to, when the well site worker is in the buffer region, acquire a moving speed of the well site worker toward the dangerous region based on the positioning tag; judge whether the moving speed is greater than a preset threshold; in response to the moving speed being greater than the preset threshold, send the alarm signal to the well site worker.

For example, in the safety management system for well site worker provided by at least one embodiment of the present disclosure, the server is further configured to: acquire profile information of the well site worker from the data management platform, wherein the profile information of the well site worker includes authority information of the well site worker; determine, based on the authority information of the well site worker, whether the alarm signal is triggered when the well site worker is located in the buffer region or the dangerous region; and trigger the alarm signal when the well site worker is located in the buffer region or the dangerous region in response to the well site worker not having an authority to enter the dangerous region.

For example, in the safety management system for well site worker provided by at least one embodiment of the present disclosure, the server is further configured to: when the well site worker is located in the dangerous region and has no authority, plan a route for the well site worker to evacuate the dangerous region according to the position information of the well site worker and the layout information of the well site, and send the evacuation route to the positioning tag via the positioning base station.

For example, in the safety management system for well site worker provided by at least one embodiment of the present disclosure, the layout information further includes functional partitioning, safety management level partitioning, a count of positioning base stations, and installation positions of the positioning base stations of the well site; the server is further configured to: determine the position information of the safety region, the dangerous region, and the buffer region between the safe region and the dangerous region of the well site according to the functional partitioning and the safety management level partitioning of the well site.

For example, in the safety management system for well site worker provided by at least one embodiment of the present disclosure, the server is further configured to: acquire a length of time duration when the well site worker is at a same position and a count of well site workers located at the same position based on the positioning tag; perform timeout monitoring and motionless monitoring on the well site worker based on the length of time duration when the well site worker is at the same position; and perform crowd monitoring on the well site workers based on the count of the well site workers located at the same position, so as to achieve real-time monitoring of the well site worker.

For example, in the safety management system for well site worker provided by at least one embodiment of the present disclosure, the server is further configured to: receive alarm information sent by the well site worker through the positioning tag, and judge a dangerous situation according to the alarm information, so as to send a rescue prompt signal to implement a corresponding rescue operation.

For example, in the safety management system for well site worker provided by at least one embodiment of the present disclosure, the server is further configured to: acquire activity trajectory of the well site worker form the data management platform, so as to perform statistics and query on a behavior of the well site worker.

At least one embodiment of that present disclosure also provides a storage medium, non-transitorily storing computer-readable instructions, the safety management method for well site worker provided by any embodiments of the present disclosure is performed when the computer-readable instructions are executed by a computer.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
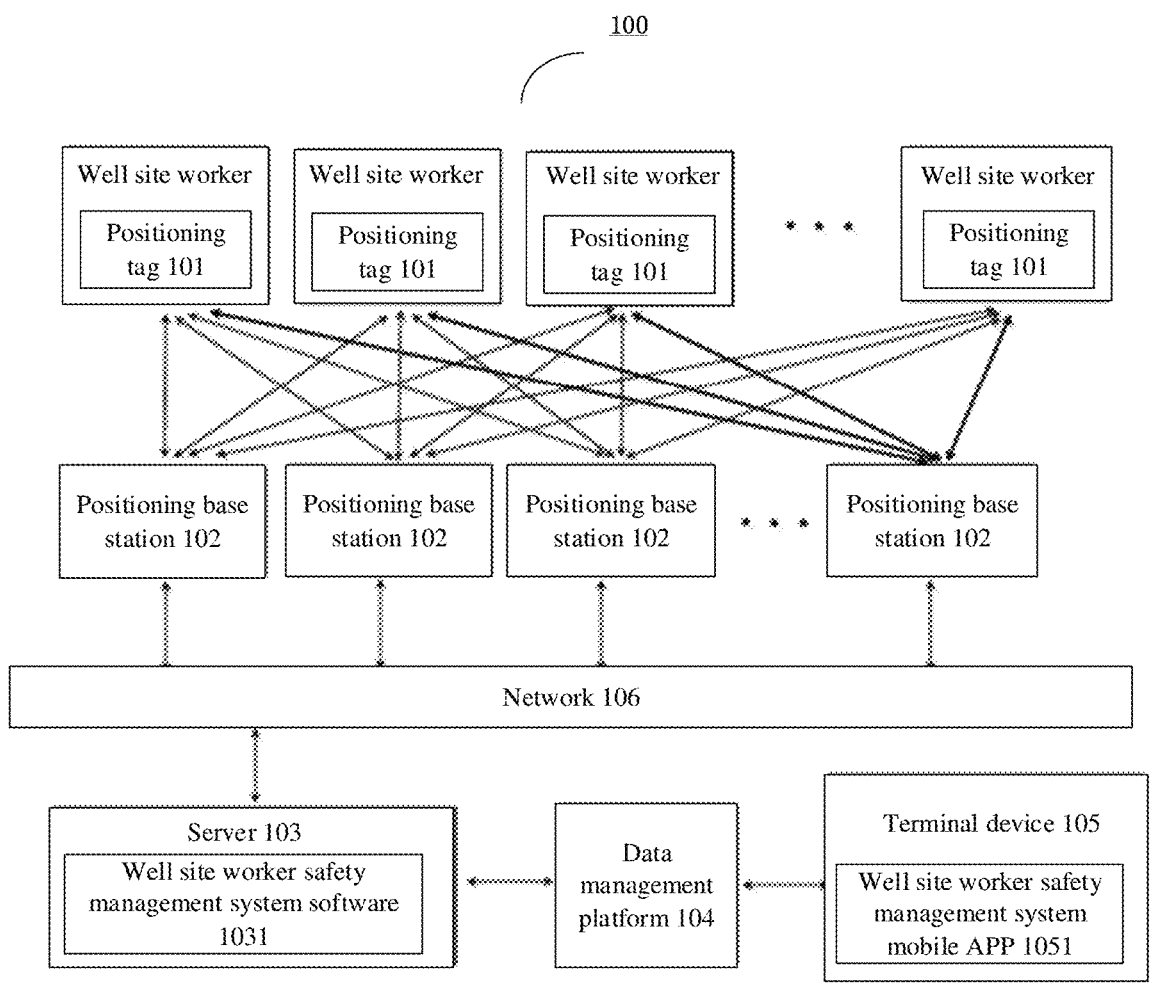
FIG. 1 is a schematic structural diagram of a safety management system for well site worker provided by at least one embodiment of the present disclosure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

There are risks of oil, gas and other media being inflammable and explosive, and potential safety hazards such as high-voltage electricity consumption in the construction operations of oil and gas field well site. According to statistics from the China Academy of Work Safety, 90% of safety accidents occur at the operation site, and 88% of the site accidents are caused by the well site worker, therefore, the safety management of well site worker is a very important work in the oil and gas field well site. In order to ensure the safe and smooth completion of various engineering projects at the well site, it is necessary to implement strict worker safety management measures.

At present, the well sites in most domestic oil and gas fields only have various danger sign boards, isolation guardrails, escape route maps, etc., and there is no worker positioning, identification, and traceability system. For example, some well sites have entry and exit worker management boards at the entrance, require worker entering and leaving the well sites to adjust the status (for example, indicating that the well site worker has entered or left) of the pass in time as required, so as to be used to confirm whether there is still worker activity in the well site in the event of an emergency. However, this method also suffers from the uncertainty of human factors.

At least one embodiment of the present disclosure provides a safety management method for well site worker, including: acquiring position information of the well site worker; acquiring layout information of a well site, where the layout information includes position information of a safe region, a dangerous region, and a buffer region between the safe region and the dangerous region in the well site; in response to the well site worker being located in the buffer region or the dangerous region, sending an alarm signal to warn the well site worker to stay away from the dangerous region.

At least one embodiment of the present disclosure further provides a system and a storage medium corresponding to the above-mentioned safety management method for well site worker.

The safety management method for well site worker provided by the embodiments of the present disclosure can provide early warning when the well site worker is close to the dangerous region, so as to avoid well site accidents caused by human factors, and at the same time achieve the safety management goal of the well site worker's "who, where, how, and what".

The embodiments of the present disclosure and some examples thereof will be described in detail below with reference to the accompanying drawings.

Figure 2:
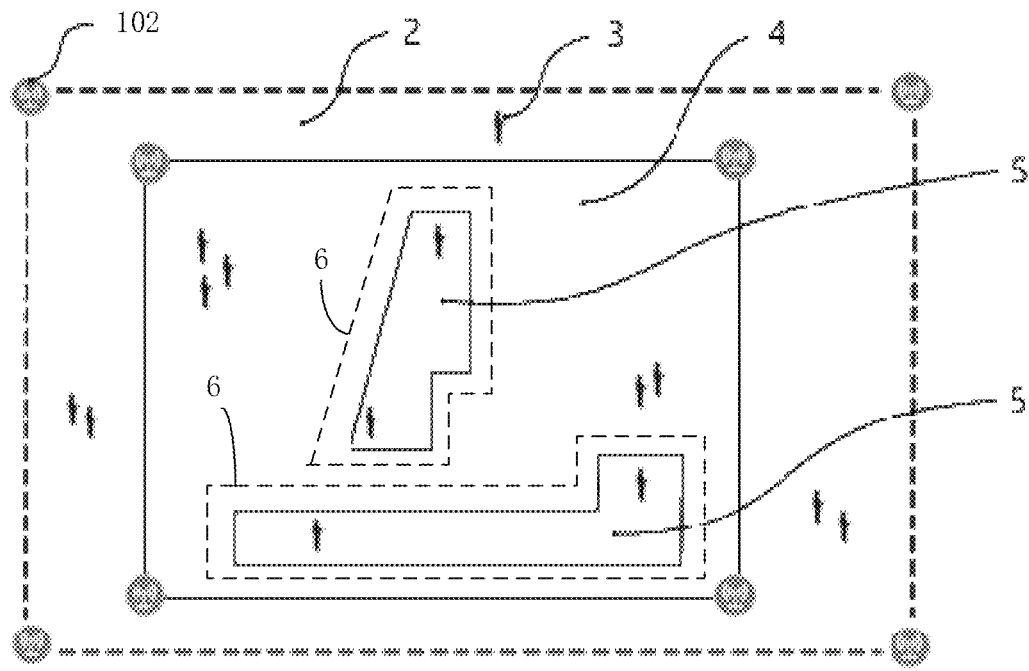
FIG. 2 is a wellsite region distribution diagram provided by at least one embodiment of the present disclosure.

At least one embodiment of the present disclosure provides a safety management system for well site worker. FIG. 1 is a schematic structural diagram of a safety management system for well site worker provided by at least one embodiment of the present disclosure; FIG. 2 is a wellsite region distribution diagram provided by at least one embodiment of the present disclosure. The safety management system for well site worker provided by at least one embodiment of the present disclosure will be described in detail below with reference to FIG. 1 and FIG. 2.

For example, as shown in FIG. 1, in some examples, the safety management system 100 for well site worker includes: a positioning tag 101, a positioning base station 102, a server 103, a data management platform 104, and a terminal device 105.

For example, the positioning tag 101 is worn by the well site worker and is configured to transmit position information of the well site worker to the positioning base station 102. For example, each well site worker wears a positioning tag 101, and each positioning tag 101 has a unique identification, so that the well site workers are in one-to-one correspondence with the positioning tags 101, so that the position information of each well site worker in the well site can be obtained according to the positioning tag. For example, the well site worker can wear the positioning tag 101 through the work card type (that is, the positioning tag is embedded in the work card), the safety helmet type (that is, the positioning tag is embedded in the safety helmet), the wristband type (that is, the positioning tag is embedded in the wristband), or other forms, the embodiments of the present disclosure do not limit this. For example, the positioning tag 101 may include a rechargeable battery to provide power to the positioning tag 101, and may also include an alarm unit to have an audible and visual alarm function, an SOS button alarm function, and the like, for example, the positioning tag 101 may also have a key intercom function, etc. The specific structure of the positioning tag 101 may be set according to actual requirements and specific conditions, and is not limited by the embodiments of the present disclosure.

For example, the positioning tag 101 can be implemented as a positioning chip or a positioning circuit module, and can be stuck on the above-mentioned word card, safety helmet, wristband, etc., and the embodiments of the present disclosure are not limited in this aspect. The specific structure can refer to designs in the art, and details are not repeated here.

For example, the positioning base station 102 is configured to transmit the received position information of the well site worker to the server 103, and transmit the instructions sent by the server 103 to the positioning tag 101, so as to achieve data communication between the positioning tag 101 and the server 103.

For example, as shown in FIG. 2, the positioning base station 102 is installed on an edge of the well site 2 or an edge of an operation region 4 in the well site 2, so that the positioning tags worn by the well site workers 3 all fall within the coverage of the positioning base station 102, thereby achieving data communication of the positioning base station. For example, the positioning tags 101 worn by several well site workers 3 establish communication and data interactive transmission with several positioning base stations 102 in the form of wireless signals.

For example, as shown in FIG. 2, the number of the positioning base stations 1 installed on site needs to be determined according to the actual area and topography of the well site 2, which is not limited in the embodiments of the present disclosure.

For example, in some examples, the positioning base station 102 can achieve the following functions through communication and data interaction with the positioning tag 101: determine the position information of the positioning tag 101 and send it to the server 103; transmit the alarm and voice intercom signal between the positioning tag 101 and the server 103 to achieve data communication between the positioning tag 101 and the server 103.

For example, the server 103 is configured to obtain the position information of the well site worker 3 and the layout information of the well site 2. For example, the layout information includes the position information of a safe region, a dangerous region 5, and a buffer region 6 located between the safe region and the dangerous region 5 within the well site 2.

For example, the operation region 4 within the well site 2 includes the safe region. For example, in some examples, the operation region 4 serves as the safe region.

For example, the dangerous region 5 is located in the operation region 4, and refers to a high-pressure region with pressure or a region with certain risk factors such as high-voltage electrical equipment, which may be determined according to the actual situation, and the embodiments of the present disclosure do not limit this.

For example, the buffer region 6 is located between the safe region and the dangerous region 5, and is a region used for early warning when the well site worker 3 approach the dangerous region 5, so that the occurrence of danger can be further prevented. For example, the buffer region can surround the periphery of the dangerous region 5, for example, the region that expands a certain distance outward from the dangerous region 5 in any direction is set as the buffer region, such as, the region enclosed by expanding a few meters outward from the dangerous region 5, which may be determined according to the actual situation, and the embodiments of the present disclosure do not limit this.

For example, in some examples, the well site worker safety management system software 1031 runs on the server 103 deployed in the well site command center and equipped with voice calling and sound playback equipment, and is responsible for establishing communication and data interactive transmission with several positioning base stations 102, so as to implement the configuration and management of the association between the positioning tag and the well site worker and their information, well site worker position calculation, well site worker safety management, data storage, and other functions.

For example, in some examples, the server 103 sends, in response to the well site worker 3 being located in the buffer region 6 or the dangerous region 5, an alarm instruction to the positioning tag 101 to instruct the alarm unit of the positioning tag to issue an alarm signal, thereby alerting the well site worker 3 to stay away from the dangerous region 5.

For example, the server 103 receives, through the positioning base station 102, the position information of the well site worker 3 transmitted from the positioning tag 101 in the well site 2, when the server 103 determines that the well site worker 3 is located in the buffer region 6 or the dangerous region 5, the server 103 sends an alarm instruction to the positioning tag 101 through the positioning base station 102 to instruct the alarm unit of the positioning tag 101 to issue an alarm signal, for example, a light early-warning, sound early-warning, or sound-light early-warning, etc., so as to warn the well site worker 3 to stay away from the dangerous region 5, so that according to the position information of the positioning tag transmitted from the positioning base station, and the information management data between the positioning tag and the well site worker, the real-time position information monitoring of the people in each region of the well site can be achieved. For example, the real-time dynamic distribution of people in the well site can be displayed, so that the scene situation is vivid and clear at a glance; by supervising the behavior of employees, the employees can form good working habits, thereby reducing illegal operations, and improving the quality of safety management; and when the employees is in danger, rescuers can quickly find the position of the employees according to their positioning, thereby improving rescue efficiency.

The server 13 may be a single server or a server group, and respective servers in the server group are connected through a wired or wireless network. A server group can be centralized, such as a data center, or can also be distributed. The server 13 may be local or remote.

For example, the data management platform 104 is configured to store the layout information of the well site 2 and acquire and store the activity trajectory data of the well site worker from the server 103.

For example, in some examples, the data management platform 104 is further configured to store the profile information of the well site worker, for example, the positioning tags 101 are in one-to-one correspondence with the profile information of the well site workers, so that by filling in the identification information such as identity information of the well site worker on the terminal device 105, the position information obtained by the positioning tag corresponding to the well site worker can be obtained. For example, the profile information may include the name, company, job title, authority information, and the like of the well site worker, for example, the configuration and management of the association between the positioning tag 101 and the profile information of the well site worker (including the binding/unbinding between the positioning tag and the well site worker, positioning tag health status monitoring, etc.) can implement the corresponding relationship in the server 103, and transmit the corresponding relationship to the data management platform 104 for storage.

The data management platform 104 may be implemented as a database, for example, may generally refer to a device with a storage function. The data management platform 104 is mainly used to store various data utilized, generated, and outputted from the terminal device 105 and the server 103 in operation. For example, the data management platform 104 stores the layout information of the well site 2 and obtains and stores the activity trajectory data of the well site worker from the server 103. When the server 103 reads, in response to the query operation (for example, an operation of querying the activity trajectory of a certain well site employee in a certain period of time) of the terminal device 105, the activity trajectory of the well site worker during the period of time from the data management platform 104, and sends the activity trajectory of the well site worker during the period of time to the terminal device 105, the terminal device 105 displays the activity trajectory of the well site worker in this period of time, the real-time dynamic distribution of people in the well site can be displayed, so that the scene situation is vivid and clear at a glance; by supervising the behavior of employees, the employees can form good working habits, thereby reducing illegal operations, and improving the quality of safety management; and when the employees is in danger, rescuers can quickly find the position of the employees according to their positioning, thereby improving rescue efficiency The data management platform 104 may be local, or remote. The data management platform 104 may include various memories, such as random access memory (RAM), read only memory (ROM), and the like. The storage devices mentioned above are just some examples, and the storage devices that can be used by the system are not limited thereto.

The data management platform 104 may be connected or communicated with the server 103 or a part thereof via the network 106, or directly connected or communicated with the server 103, or a combination of the above two methods.

In some embodiments, the data management platform 104 may be a stand-alone device. In other embodiments, the data management platform 104 may also be integrated in at least one of the terminal device 105 and the server 103. For example, the data management platform 104 may be set on the terminal device 105 or on the server 103. For another example, the data management platform 104 may also be distributed, a part of the data management platform 104 is provided on the terminal device 105 and the other part of the data management platform 104 is provided on the server 103.

For example, the network 106 may be a single network, or a combination of at least two different networks. For example, the network 106 may include, but is not limited to, one or a combination of a local area network, a wide area network, a public network, a private network, and the like. For example, in some examples, several wireless positioning base stations establish a communicative connection with the server 103 via a wired network, Ethernet, or a wireless network (e.g., WiFi).

For example, the terminal device 105 is configured to monitor and query the activity trajectory of the well site worker 3 based on the activity data of the well site worker stored in the data management platform 104.

For example, the terminal device 105 may be a computer, a mobile phone, or the like. It can be understood that the terminal device 105 may be any other type of electronic device capable of performing data processing, and may include, but is not limited to, a desktop computer, a laptop computer, a tablet computer, a smart phone, a smart home device, a wearable device, in-vehicle electronics equipment, monitoring equipment, etc. The terminal device may also be any equipment provided with electronic equipment, such as a vehicle, a robot, and the like.

The user can operate the application (for example, the well site worker safety management system mobile APP 1051) installed on the terminal device 105, the application program transmits the user behavior data to the server 13 through the network 106, and the terminal device 105 can also receive the data transmitted by the server 13 through the network 106. The terminal device 105 can query the activity trajectory of the well site worker by means of running a sub-program or a sub-thread.

For example, when the user uses the well site worker safety management system mobile APP 1051 on the terminal device 105, the well site worker safety management system mobile APP on the terminal device 105 displays the profile information (e g, name, picture, etc.) of the well site worker, the user sends a query instruction to the server 103 by clicking on the well site worker to be queried, and the server 103 acquires the activity trajectory of the well site worker according to the profile information of the well site worker in the query instruction and the corresponding relationship, stored in the data management platform 104, between the profile information of the well site worker and the positioning tag. For example, the query instruction may also include selection of a time period, selection of a region, etc., which may be determined by actual conditions, and the embodiments of the present disclosure do not limit this.

For example, the terminal device 105 may include a touch screen, so the user can directly click a button on the screen with a finger to query and monitor the activity trajectory of the well site worker. For example, the terminal device 105 may also include a mouse, so the user uses the mouse to click on the position of the cursor on the screen to query and monitor the activity trajectory of the well site worker.

In some embodiments, the processing unit of the terminal device 105 may be used to execute the safety management method for well site worker provided by the embodiments of the present disclosure. In some implementations, the terminal device 105 may utilize an application program built into the terminal device 105 to execute the safety management method for well site worker. In other implementations, the terminal device 105 may execute the safety management method for well site worker provided by at least one embodiment of the present disclosure by invoking an application program stored outside the terminal device 105.

In other embodiments, the terminal device 105 sends, for example, a query instruction to the server 103 via the network 106, and the server 103 executes the safety management method for well site worker. In some implementations, the server 103 may implement the safety management method for well site worker using an application program built into the server. In other implementations, the server 103 may execute the safety management method for well site worker by invoking an application program stored outside the server 103, which is not limited in the embodiments of the present disclosure.

For the sake of clarity and conciseness, the embodiments of the present disclosure do not provide all the constituent units of the safety management system 100 for well site worker. In order to implement the necessary functions of the safety management system 100 for well site worker, those skilled in the art may provide or set other unshown constituent units according to specific needs, and the embodiments of the present disclosure do not limit this.

The safety management system for well site worker provided by the embodiments of the present disclosure can provide early warning when the well site worker is close to the dangerous region, so as to avoid well site accidents caused by human factors, and at the same time achieve the safety management goal of the well site worker's "who, where, how, and what". In addition, when an emergency occurs, it can quickly alarm and display the position of the well site worker in the emergency, so that the most effective measures can be taken to ensure the safety of the worker in the well site to the greatest extent.

At least one embodiment of the present disclosure also provides a safety management method for well site worker. For example, the safety management method for well site worker is run and implemented by the server in the safety management system for well site workers, and of course can also be run and implemented by other processors, and the embodiments of the present disclosure do not limit this.

Figure 3:
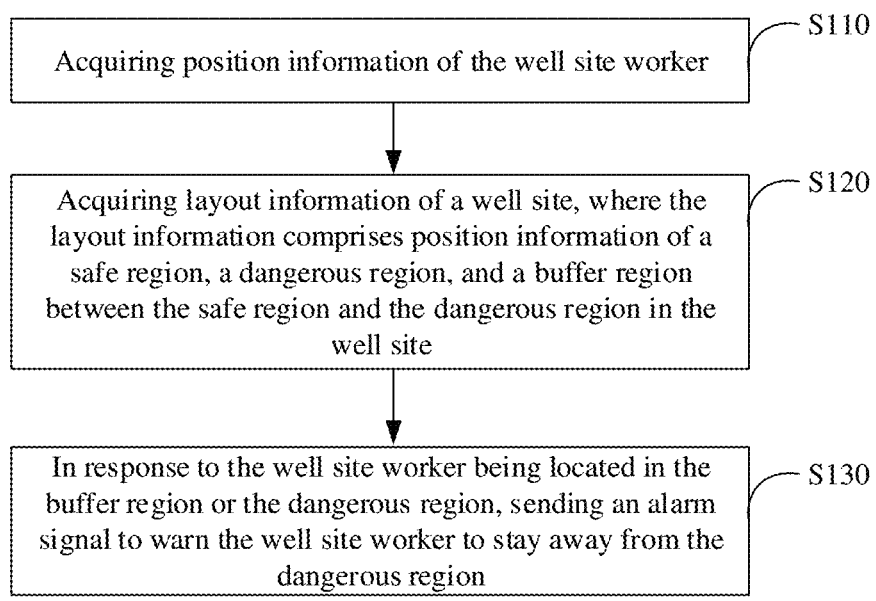
FIG. 3 is a flowchart of a safety management method for well site worker provided by at least one embodiment of the present disclosure.

FIG. 3 is a flowchart of a safety management method for well site worker provided by at least one embodiment of the present disclosure. The safety management method for well site worker provided by at least one embodiment of the present disclosure is described in detail with reference to FIG. 3 below.

For example, in some examples, as shown in FIG. 3, the safety management method for well site worker includes steps S110 to S130.

Step S110: acquiring position information of the well site worker.

Step S120: acquiring layout information of a well site, where the layout information comprises position information of a safe region, a dangerous region, and a buffer region between the safe region and the dangerous region in the well site.

Step S130: in response to the well site worker being located in the buffer region or the dangerous region, sending an alarm signal to warn the well site worker to stay away from the dangerous region.

In the step S110, for example, in some examples, the server 103 receives, through the positioning base station 102, the position information of the well site worker 3 transmitted from the positioning tag 101 in the well site 2; for example, in other examples, the position information of the well site worker at any time period is uploaded by the server 103 to the data management platform 104 for storage, so that when the user invokes the activity trajectory of a certain well site worker in a certain period of time through the well site worker safety management system mobile APP on the terminal device, the server 103 can call the position information, that is, the activity trajectory, of the well site worker in this period of time from the data management platform 104.

In step S120, for example, in some examples, the safety management system for well site worker supports the configuration and management of well site scenarios, and supports the import of well site layout diagram. For example, the well site layout diagram is uploaded by the server to the data management platform 104 for storage, so that the specific position of the well site worker can be determined according to the position information of the well site worker and the well site layout diagram.

For example, in some examples, the layout information of the well site may include the functional partitioning, safety management level partitioning, a count of positioning base stations, and installation positions of the positioning base stations of the well site, and the like, may further include the topographical size of the well site, etc., the embodiments of the present disclosure do not limit this.

For example, in this example, the method further includes: determining the position information of the safety region, the dangerous region, and the buffer region of the well site according to the functional partitioning and the safety management level partitioning of the well site.

For example, the operation region 4 within the well site 2 includes the safe region. For example, in some examples, the operation region 4 serves as the safe region.

For example, the dangerous region 5 is located in the operation region 4, and refers to a high-pressure region with pressure or a region with certain risk factors such as high-voltage electrical equipment.

For example, the buffer region 6 is located between the safe region and the dangerous region 5, and is a region used for early warning when the well site worker 3 approach the dangerous region 5, so that the occurrence of danger can be further prevented. For example, the buffer region can surround the periphery of the dangerous region 5, for example, the region that expands a certain distance outward from the dangerous region 5 in any direction is set as the buffer region, such as, the region enclosed by expanding a few meters outward from the dangerous region 5, which may be determined according to the actual situation, and the embodiments of the present disclosure do not limit this.

In step S130, for example, when the server 103 determines that the well site worker 3 is located in the buffer region 6 or the dangerous region 5, the server 103 sends an alarm instruction to the positioning tag 101 through the positioning base station 102 to instruct the alarm unit of the positioning tag 101 to issue an alarm signal, for example, a light early-warning, sound early-warning, or sound-light early-warning, etc., so as to warn the well site worker 3 to stay away from the dangerous region 5, so that according to the position information of the positioning tag transmitted from the positioning base station, and the information management data between the positioning tag and the well site worker, the real-time position information monitoring of the people in each region of the well site can be achieved. For example, the real-time dynamic distribution of people in the well site can be displayed, so that the scene situation is vivid and clear at a glance; by supervising the behavior of employees, the employees can form good working habits, thereby reducing illegal operations, and improving the quality of safety management; and when the employees is in danger, rescuers can quickly find the position of the employees according to their positioning, thereby improving rescue efficiency.

Figure 4:
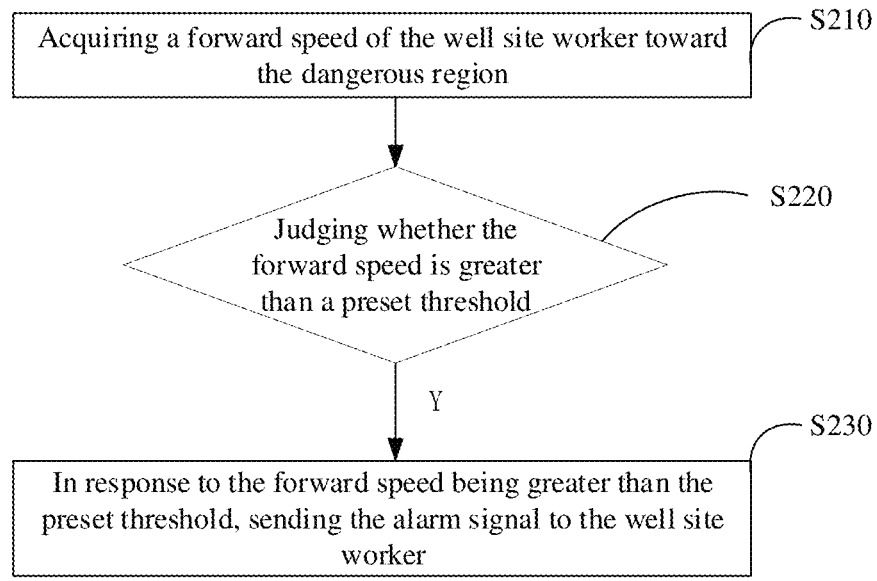
FIG. 4 is a flowchart of another safety management method for well site worker provided by at least one embodiment of the present disclosure.

FIG. 4 is a flowchart of another safety management method for well site worker provided by at least one embodiment of the present disclosure. For example, as shown in FIG. 4, based on the example shown in FIG. 3, the safety management method for well site worker further includes steps S210 to S230.

Step S210: acquiring a moving speed of the well site worker toward the dangerous region.

Step S220: judging whether the moving speed is greater than a preset threshold.

Step S230: in response to the moving speed being greater than the preset threshold, sending the alarm signal to the well site worker.

In step S210, for example, the positioning tag 101 is provided with a speed sensor, a gyroscope, and a direction sensor, and the moving speed of the well site worker toward the dangerous region is obtained through the speed sensor, the gyroscope, and the direction sensor, and the moving speed of the well site worker toward the dangerous region is transmitted to the server 103 through the positioning base station 102.

In step S220, for example, the preset threshold may be determined according to the actual situation, which is not limited in this embodiment of the present disclosure.

In step S230, for example, when the server 103 determines that the well site worker 3 is located in the buffer region 6 and the moving speed of the well site worker 3 is greater than the preset threshold, the positioning base station 102 sends an alarm instruction to the positioning tag 101 to instruct the alarm unit of the positioning tag 101 to issue an alarm signal, such as, light early-warning, sound early-warning, or sound-light early-warning, etc., so as to warn the well site worker 3 to stay away from the dangerous region 5.

For example, in the embodiment of the present disclosure, by determining the moving speed of the well site worker toward the dangerous region, it can be pre-determined whether the well site worker foresee the dangerous region. When the moving speed is greater than the preset threshold, it indicates that the controllable degree of the danger of the well site worker becomes smaller, so that an early warning is issued to warn the well site worker that he/she is about to be in a dangerous situation, so that the occurrence of danger can be avoided.

Figure 5:
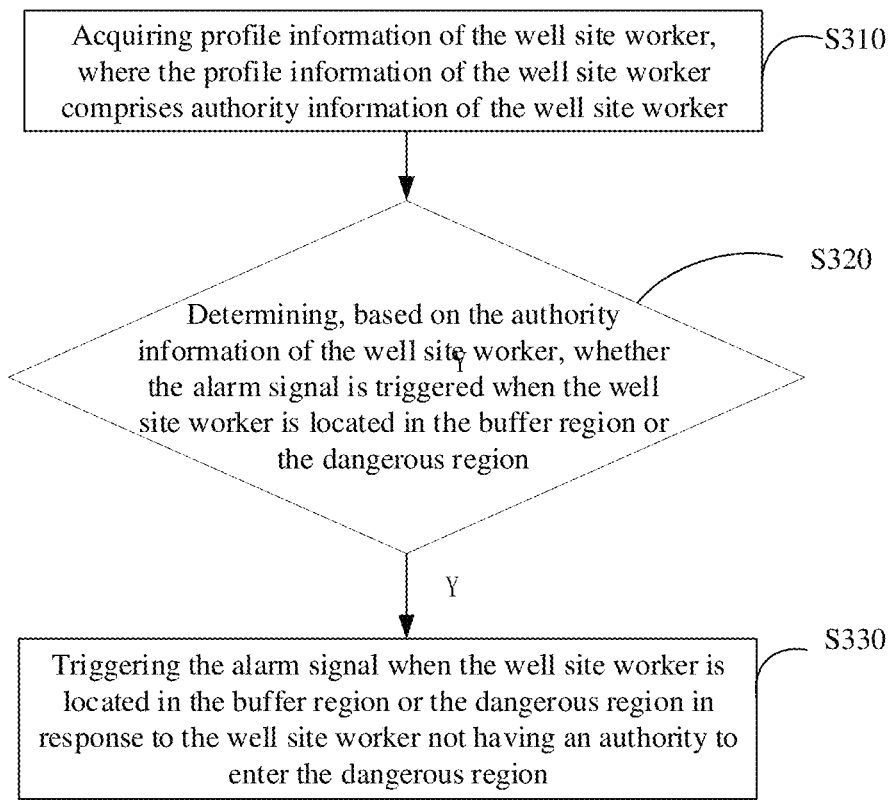
FIG. 5 is a flowchart of another safety management method for well site worker provided by at least one embodiment of the present disclosure.

FIG. 5 is a flowchart of another safety management method for well site worker provided by at least one embodiment of the present disclosure. For example, as shown in FIG. 5, based on the example shown in FIG. 4, the safety management method for well site worker further includes steps S310 to S330.

Step S310: acquiring profile information of the well site worker, where the profile information of the well site worker comprises authority information of the well site worker.

Step S320: determining, based on the authority information of the well site worker, whether the alarm signal is triggered when the well site worker is located in the buffer region or the dangerous region.

Step S330: triggering the alarm signal when the well site worker is located in the buffer region or the dangerous region in response to the well site worker not having an authority to enter the dangerous region.

In step S310, for example, in some examples, the data management platform 104 stores the profile information of the well site worker, for example, the positioning tags 101 are in one-to-one correspondence with the profile information of the well site workers, so that by filling in the identification information such as identity information of the well site worker on the terminal device 105, the position information obtained by the positioning tag corresponding to the well site worker can be obtained. For example, the profile information may include the name, company, job title, authority information, and the like of the well site worker, for example, the configuration and management of the association between the positioning tag 101 and the profile information of the well site worker (including the binding/unbinding between the positioning tag and the well site worker, positioning tag health status monitoring, etc.) can implement the corresponding relationship in the server 103, and transmit the corresponding relationship to the data management platform 104 for storage.

For example, the authority information indicates the authority of the activity region of the well site worker, and whether there is the authority to enter the dangerous region or other authority, etc., and the embodiments of the present disclosure do not limit this.

In step S320, for example, based on the authority information of the well site worker, it can be determined whether the alarm signal is triggered when the well site worker is located in the buffer region or the dangerous region. For example, when the well site worker has the authority to enter the dangerous region, when the well site worker is located in the buffer region or dangerous region, or when the moving speed of the well site worker toward the dangerous region is greater than the preset speed, no early warning is given, that is, no alarm signal is triggered.

In step S330, when the well site worker does not have the authority to enter the dangerous region, when the well site worker is located in the buffer region or the dangerous region, an alarm signal is triggered, so that the alarm information can be sent accurately, thereby avoiding unnecessary early warning and avoiding causing panic among the workers, and thus improving the operation efficiency of well site worker.

For example, in other examples, as shown in FIG. 2, an electronic fence can be provided in the dangerous region 5 in the well site, if the well site worker 3 without access authority enters this region, the system triggers an alarm prompt message, and sends an alarm instruction to the positioning tag carried by the well site worker 3, and after the positioning tag receives the alarm instruction, a sound-light alarm signal will be issued. The system administrator can also send a voice call to the positioning tag carried by the well site worker 3 through the voice intercom function in the system, and issue an evacuation order to the well site worker 3, so as to avoid the danger caused by human factors.

For example, in other examples, in response to the well site worker being located in the dangerous region and having no authority to trigger the alarm signal, the safety management method for well site worker further includes: planning a route for the well site worker to evacuate the dangerous region according to the position information of the well site worker and the layout information of the well site. For example, in this example, the well site worker can be informed of the evacuation direction and route by means of voice broadcast, and the evacuation route can also be displayed on the display screen of the positioning tag, which can be set according to the actual situation, and the embodiments of the present disclosure do not limit this.

The method for determining the route for evacuation from the dangerous region may adopt the technical method in the art, and similar portions will not be repeated here.

For example, in some examples, the safety management method for well site worker further includes: acquiring a duration when the well site worker is at a same position and a count of well site workers located at the same position; performing timeout monitoring and motionless monitoring on the well site worker based on the duration when the well site worker is at the same position; and performing crowd monitoring on the well site workers based on the count of the well site workers located at the same position, so as to achieve real-time monitoring of the well site worker.

For example, through establishing an algorithm model and through performing real-time monitoring on the behaviors of all workers in the well site region, including the timeout monitoring, the crowd monitoring, and the motionless monitoring, the intellectualization management of the safety of the well site worker can be achieved, the management quality can be improved, and safety of employees can be guaranteed.

For example, in other examples, the safety management method for well site worker further includes: receiving alarm information sent by the well site worker, and judging a dangerous situation according to the alarm information, so as to send a rescue prompt signal to implement a corresponding rescue operation.

In this example, when a dangerous situation occurs during the operation of the well site worker, the employee can send the alarm information to the safety management system for well site worker in real time by repeatedly pressing the SOS button on the positioning tag that is carried at any time; it is also possible to press the intercom button to initiate an intercom with the manager of the safety management system for well site worker to initiate an alarm, so that when the well site employees are in danger, they can call for help and give an early warning at the first time, and the rescuers can quickly find the positions of the well site employees according to their positioning, thus improving rescue efficiency and ensuring well site safety.

For example, in some examples, the safety management method for well site worker further includes: acquiring activity trajectory data of the well site worker, so as to perform statistics and query on a behavior of the well site worker, thereby achieving the functions of the real-time activity trajectory view of the well site worker, the activity trajectory playback at any period of time, and statistics and query on the exit/entry region and behaviors violating safety management.

For example, in the embodiment of the present disclosure, the data management platform 104 (e.g., cloud platform) reads and stores the scene configuration of the well site, the real-time position information of all workers in the well site, and the profile information of the well site worker from the server 103, can achieve real-time monitoring of the real-time positions of workers in the well site and trigger alarm conditions on any client computer at any time and place, and can also view the real-time activity trajectory of any well site worker, play back the activity trajectory for any period of time, perform statistics and queries on the exit/entry region and behaviors violating safety management.

In the embodiments of the present disclosure, the flow of the safety management method of well site worker provided by the above embodiments of the present disclosure may include more or less operations, and these operations may be performed sequentially or in parallel. Although the flow of the safety management method well site worker described above includes a plurality of operations occurring in a particular order, it should be clearly understood that the order of the plurality of operations is not limited. The above-described safety management method for well site worker can be performed once or several times according to predetermined conditions.

Figure 6:
FIG. 6 is a schematic diagram of a terminal device provided by at least one embodiment of the present disclosure.

FIG. 6 is a schematic diagram of a terminal device provided by at least one embodiment of the present disclosure.

For example, as shown in FIG. 6, the well site worker safety management system mobile app running on authorized mobile terminal devices such as mobile phones and tablet computers reads the scene configuration of the well site and the real-time position information and worker file data of all workers in the well site from the data management platform, can achieve real-time monitoring of the real-time position of the worker in the well site and trigger alarm conditions, and can also view the real-time activity trajectory of any wellsite worker and play back the activity trajectory of any period of time.

The safety management method for well site worker provided by the embodiments of the present disclosure can provide early warning when the well site worker is close to the dangerous region, so as to avoid well site accidents caused by human factors, and at the same time achieve the safety management goal of the well site worker's "who, where, how, and what". In addition, when an emergency occurs, the method can quickly give an alarm and display the position of the well site worker in the emergency, so that the most effective measures can be taken to ensure the safety of the worker in the well site to the greatest extent.

For example, in some examples, in the safety management system for well site worker shown in FIG. 1, the server 103 is further configured to acquire a moving speed of the well site worker toward the dangerous region based on the positioning tag when the well site worker is in the buffer region; judge whether the moving speed is greater than a preset threshold; in response to the moving speed being greater than the preset threshold, send the alarm signal to the well site worker.

For example, in some examples, the server 103 is also configured to: acquire profile information of the well site worker from the data management platform, where the profile information of the well site worker comprises authority information of the well site worker; determine, based on the authority information of the well site worker, whether the alarm signal is triggered when the well site worker is located in the buffer region or the dangerous region; and trigger the alarm signal when the well site worker is located in the buffer region or the dangerous region in response to the well site worker not having an authority to enter the dangerous region.

For example, in some examples, the server 103 is also configured to: when the well site worker is located in the dangerous region and has no authority, plan a route for the well site worker to evacuate the dangerous region according to the position information of the well site worker and the layout information of the well site, and send the evacuation route to the positioning tag via the positioning base station.

For example, in some examples, the layout information further comprises functional partitioning, safety management level partitioning, a count of positioning base stations, and installation positions of the positioning base stations of the well site; the server 103 is further configured to: determine the position information of the safety region, the dangerous region, and the buffer region between the safe region and the dangerous region of the well site according to the functional partitioning and the safety management level partitioning of the well site.

For example, in some examples, the server 103 is also configured to: acquire a duration when the well site worker is at the same position and a count of well site workers located at the same position based on the positioning tag; perform timeout monitoring and motionless monitoring on the well site worker based on the duration when the well site worker is at the same position; and perform crowd monitoring on the well site workers based on the count of the well site workers located at the same position, so as to achieve real-time monitoring of the well site worker.

For example, in some examples, the server 103 is also configured to: receive alarm information sent by the well site worker through the positioning tag, and judge a dangerous situation according to the alarm information, so as to send a rescue prompt signal to implement a corresponding rescue operation.

For example, in some examples, the server 103 is also configured to: acquire activity trajectory of the well site worker form the data management platform 104, so as to perform statistics and query on a behavior of the well site worker.

Figure 7:
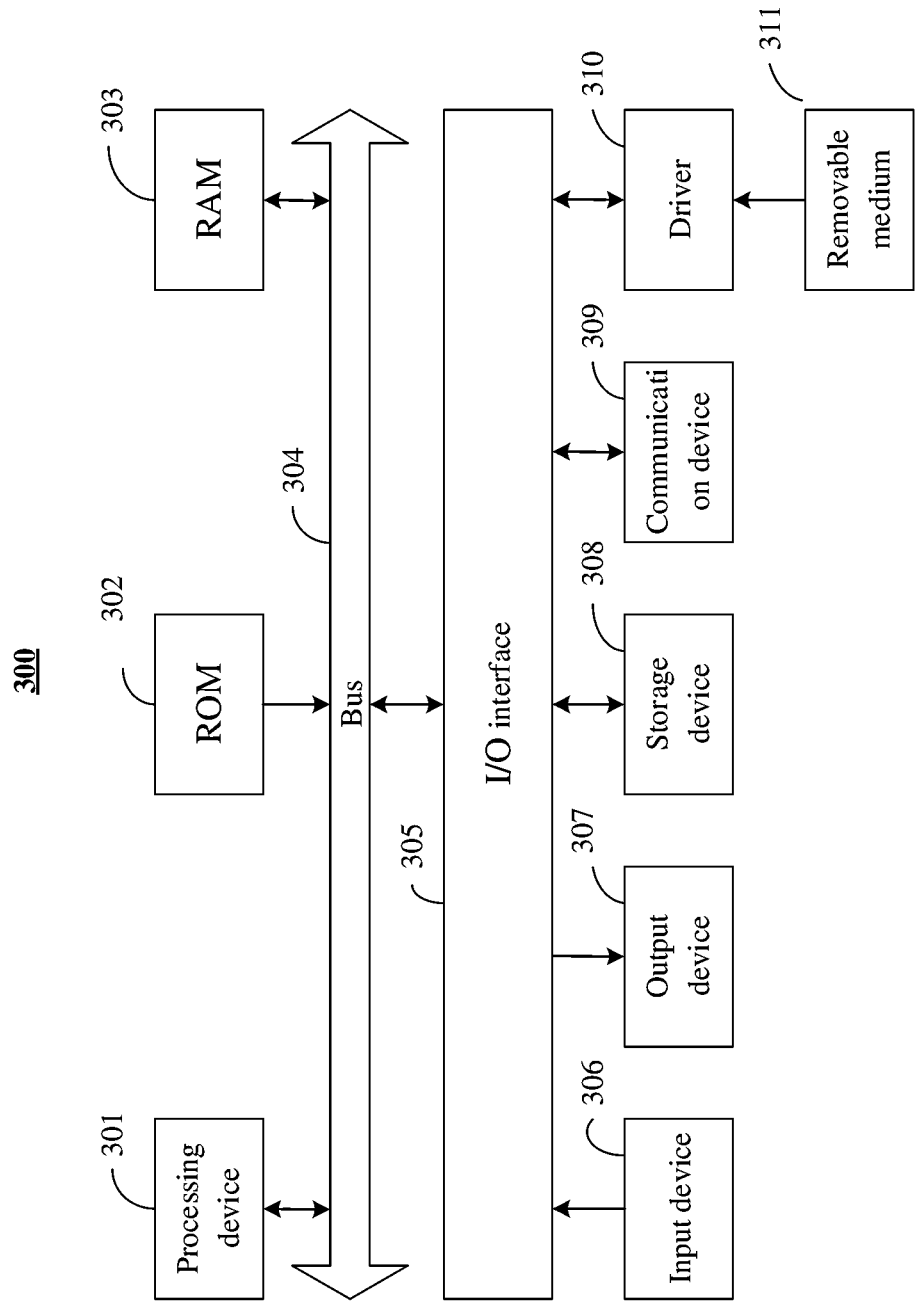
FIG. 7 is a schematic diagram of an electronic device provided by at least one embodiment of the present disclosure.

FIG. 7 is a schematic diagram of an electronic device provided by at least one embodiment of the present disclosure. For example, the electronic device is a terminal device, and the embodiments of the present disclosure do not limit this.

For example, as shown in FIG. 7, in some examples, the electronic device 300 includes a processing device (e.g., a central processing unit, a graphics processing unit, etc.) 301, which may perform various appropriate actions and processes according to programs stored in a read only memory (ROM) 302 or loaded into a random access memory (RAM) 303 from a storage device 308. In the RAM 303, various programs and data necessary for the operation of the computer system are also stored. The processing device 301, the ROM 302, and the RAM 303 are connected through a bus 304. An input/output (I/O) interface 305 is also connected to the bus 304.

For example, the following components may be connected to the I/O interface 305: an input device 306 including, for example, a touch screen, a touchpad, a keyboard, a mouse, a camera, a microphone, an accelerometer, a gyroscope, etc.; an output device 307 including, for example, a liquid crystal display (LCD), a speaker, a vibrator, etc.; the storage device 308 including, e.g., a magnetic tape, a hard disk, etc.; and a communication device 309 including network interface cards such as LAN cards, modems, and the like. The communication device 309 may allow the electronic device 300 to perform wireless or wired communication with other devices to exchange data, and perform communication processing via a network such as the Internet. A driver 310 is also connected to the I/O interface 305 as needed. A removable medium 311, such as a magnetic disk, an optical disk, a magneto-optical disk, a semiconductor memory, etc., is mounted on the driver 310 as needed, so that a computer program read therefrom is installed into the storage device 308 as needed. Although FIG. 7 shows the electronic device 300 including various devices, it should be understood that not all of the illustrated devices are required to be implemented or included. More or fewer devices may alternatively be implemented or included.

For example, the electronic device 300 may further include a peripheral interface (not shown in the figure) and the like. The peripheral interface may be various types of interfaces, such as a USB interface, a lightning interface, and the like. The communication device 309 may communicate with the network and other devices by wireless communication, for example, the network is the Internet, an intranet and/or a wireless network such as a cellular telephone network, a wireless local area network (LAN), and/or a metropolitan area network (MAN). The wireless communication may use any of a variety of communication standards, protocols, and technologies, including, but not limited to, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (e.g., based on IEEE 802.11a, IEEE 802.11b, IEEE 802.11g, and/or IEEE 802.11n standards), Voice over Internet Protocol (VoIP), Wi-MAX, protocols for email, instant messaging and/or Short Message Service (SMS), or any other suitable communication protocol.

For example, the electronic device may be any device such as a mobile phone, a tablet computer, a notebook computer, an e-book, a game console, a television, a digital photo frame, a navigator, etc., or any combination of electronic devices and hardware, which is not limited by the embodiments of the present disclosure.

For example, the processes described above with reference to the flowcharts may be implemented as computer software programs according to the embodiments of the present disclosure. For example, the embodiments of the present disclosure include a computer program product comprising a computer program carried on a non-transitory computer readable medium, the computer program contains program code for performing the method illustrated in the flowchart. In such an embodiment, the computer program may be downloaded and installed from the network via the communication device 309, or installed from the storage device 308, or installed from the ROM 302. When the computer program is executed by the processing device 301, the functions of the above-mentioned safety management method for well site worker defined in the method of the embodiments of the present disclosure are executed.

The computer-readable medium mentioned above in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus, or device, or a combination of any of the above. More specific examples of the computer-readable storage medium may include, but are not limited to, electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above. In embodiments of the present disclosure, the computer-readable storage medium may be any tangible medium that contains or stores a program that can be used by or in conjunction with an instruction execution system, apparatus, or device. Rather, in embodiments of the present disclosure, the computer-readable signal medium may include data signals in baseband or propagated as part of a carrier wave, the computer-readable program code is carried in the data signals. Such propagated data signals may take a variety of forms, including but not limited to electromagnetic signals, optical signals, or any suitable combination of the above-mentioned signals. The computer-readable signal medium can also be any computer-readable medium other than the computer-readable storage medium, and the computer-readable signal medium can transmit, propagate, or transport the program for use by or in connection with the instruction execution system, apparatus, or device. Program code included in the computer-readable medium may be transmitted using any suitable medium including, but not limited to, electrical wire, optical fiber cable, RF (radio frequency), etc., or any suitable combination of the foregoing.

In some embodiments, the client and the server can use any currently known or future developed network protocol such as HTTP (HyperText Transfer Protocol) to communicate, and can be interconnected with the digital data communication (egg, a communication network) in any form or medium. Examples of the communication network include local area networks ("LAN"), wide area networks ("WAN"), the Internet (e.g., the Internet), and peer-to-peer networks (e.g., ad hoc peer-to-peer networks), as well as any currently known or future developed networks.

The above-mentioned computer-readable medium may be included in the above-mentioned electronic device; or may exist alone without being assembled into the electronic device.

The above-mentioned computer-readable medium carries one or more programs, and when the above-mentioned one or more programs are executed by the electronic device, the electronic device: obtains at least two Internet Protocol addresses; sends a node evaluation request including the at least two Internet Protocol addresses to a node evaluation device, so that the node evaluation device selects an Internet Protocol address from the at least two Internet Protocol addresses and returns it; receives the Internet Protocol address returned by the node evaluation device; the acquired Internet Protocol address indicates an edge node in the content distribution network.

Or, the above computer-readable medium carries one or more programs, and when the one or more programs are executed by the electronic device, the electronic device: receives a node evaluation request including at least two Internet Protocol addresses; selects an Internet Protocol address from the at least two Internet Protocol addresses; returns the selected Internet Protocol address; the received Internet Protocol address indicates an edge node in the content distribution network.

Computer program codes for executing the operations of the present disclosure may be written in one or more programming languages or a combination thereof, such programming languages include, but are not limited to, object-oriented programming languages—such as Java, Smalltalk, C++, and also include conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN) or a wide area network (WAN), or may be connected to an external computer (e.g., using an Internet service provider to connect via the Internet).

The functions described herein above may be performed, at least in part, by one or more hardware logic components. For example, without limitation, exemplary types of the hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs), and the like.

In various embodiments of the present disclosure, a machine-readable medium may be a tangible medium that may contain or store a program for use by or in connection with the instruction execution system, apparatus, or device. The machine-readable medium may be a machine-readable signal medium or a machine-readable storage medium. The machine-readable medium may include, but are not limited to, electronic, magnetic, optical, electromagnetic, infrared, or semiconductor systems, apparatuses, or devices, or any suitable combination of the foregoing. More specific examples of the machine-readable storage medium would include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination of the foregoing.

Figure 8:
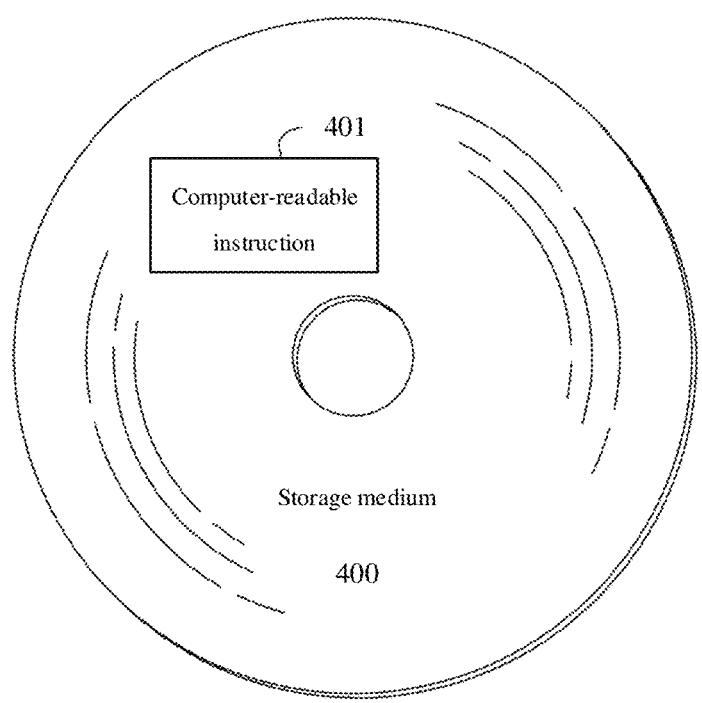
FIG. 8 is a schematic diagram of a storage medium provided by at least one embodiment of the present disclosure.

At least one embodiment of the present disclosure also provides a storage medium. FIG. 8 is a schematic diagram of a storage medium provided by at least one embodiment of the present disclosure. For example, as shown in FIG. 8, the storage medium 400 non-transitorily stores computer-readable instructions 401, and when the non-transitory computer-readable instructions are executed by a computer (including a processor), the safety management method for well site worker provided by any of the embodiments of the present disclosure can be performed.

For example, the storage medium can be any combination of one or more computer-readable storage media, for example, one computer-readable storage medium includes computer-readable program code for acquiring position information of the well site worker and layout information of a well site, and another computer-readable storage medium includes computer-readable program code for sending, in response to the well site worker being located in the buffer region or the dangerous region, an alarm signal to warn the well site worker to stay away from the dangerous region. For example, when the program code is read by a computer, the computer can execute the program code stored in the computer storage medium to execute, for example, the safety management method for well site worker provided by any embodiment of the present disclosure.

For example, the storage medium may include a memory card of a smartphone, a storage component of a tablet computer, a hard disk of a personal computer, random access memory (RAM), read only memory (ROM), erasable programmable read only memory (EPROM), a portable compact disk read only memory (CD-ROM), flash memory, or any combination of the above storage media, may also be other suitable storage media.

The storage medium provided by the embodiments of the present disclosure can provide early warning when the well site worker is close to the dangerous region, so as to avoid well site accidents caused by human factors, and at the same time achieve the safety management goal of the well site worker's "who, where, how, and what". In addition, when an emergency occurs, it can quickly alarm and display the position of the well site worker in the emergency, so that the most effective measures can be taken to ensure the safety of the worker in the well site to the greatest extent.

The drawings involve only the structure(s) in connection with the embodiment(s) of the present disclosure, and other structure(s) can be referred to common design(s).

In case of no conflict, features in one embodiment or in different embodiments can be combined to obtain new embodiments.

What have been described above are only exemplary implementations of the present disclosure, and are not intended to limit the protection scope of the present disclosure. The protection scope of the present disclosure is based on the protection scope of the claims.

What is claimed is:

1. A safety management method for well site worker, comprising:
   acquiring, by a server from a positioning tag, position information of a well site worker wearing the positioning tag;
   acquiring, by the server, layout information of a well site, wherein the layout information comprises position information of a safe region, a dangerous region, and a buffer region between the safe region and the dangerous region in the well site; and
   in response to the well site worker being located in the buffer region or the dangerous region, sending, by the server, an alarm signal to the positioning tag to trigger an alarm for warning the well site worker to stay away from the dangerous region.

2. The safety management method for well site worker according to claim 1, further comprising:
   acquiring a moving speed of the well site worker toward the dangerous region;

judging whether the moving speed is greater than a preset threshold; and in response to the moving speed being greater than the preset threshold, sending the alarm signal to the well site worker.

3. The safety management method for well site worker according to claim 1, further comprising:

acquiring profile information of the well site worker, wherein the profile information of the well site worker comprises authority information of the well site worker;

determining, based on the authority information of the well site worker, whether the alarm signal is triggered when the well site worker is located in the buffer region or the dangerous region; and triggering the alarm signal when the well site worker is located in the buffer region or the dangerous region in response to the well site worker not having an authority to enter the dangerous region.

4. The safety management method for well site worker according to claim 3, wherein in response to the well site worker being located in the dangerous region and not having the authority to enter the dangerous region, the method further comprises:

planning a route for the well site worker to evacuate the dangerous region according to the position information of the well site worker and the layout information of the well site.

5. The safety management method for well site worker according to claim 1, wherein the layout information further comprises functional partitioning, safety management level partitioning, a count of positioning base stations, and installation positions of the positioning base stations of the well site;

wherein the method further comprises: determining the position information of the safety region, the dangerous region, and the buffer region of the well site according to the functional partitioning and the safety management level partitioning of the well site.

6. The safety management method for well site worker according to claim 1, further comprising:

acquiring a duration when the well site worker is at a same position and a count of well site workers located at the same position;

performing timeout monitoring and motionless monitoring on the well site worker based on the duration when the well site worker is at the same position; and performing crowd monitoring on the well site worker based on the count of well site workers located at the same position.

7. The safety management method for well site worker according to claim 1, further comprising:

receiving alarm information sent by the well site worker, and judging a dangerous situation according to the alarm information, so as to send a rescue prompt signal to implement a corresponding rescue operation.

8. The safety management method for well site worker according to claim 1, further comprising:

acquiring activity trajectory data of the well site worker, so as to perform statistics and query on a behavior of the well site worker.

9. A safety management system for well site worker, comprising: a positioning tag, a positioning base station, a server, a data management platform, and a terminal device;

wherein the positioning tag is worn by a well site worker and is configured to transmit position information of the well site worker to the positioning base station, wherein the positioning tag comprises an alarm;

the positioning base station is configured to receive the position information of the well site, transmit the received position information of the well site worker to the server, and transmit an instruction sent by the server to the positioning tag, so as to achieve data communication between the positioning tag and the server;

the server is configured to acquire the position information of the well site worker and layout information of a well site, wherein the layout information comprises position information of a safe region, a dangerous region, and a buffer region between the safe region and the dangerous region in the well site; and to send, in response to the well site worker being located in the buffer region or the dangerous region, an alarm instruction to the positioning tag to instruct the alarm of the positioning tag to issue an alarm signal to warn the well site worker to stay away from the dangerous region;

the data management platform is configured to store the layout information of the well site and acquire and store activity trajectory data of the well site worker from the server; and the terminal device is configured to monitor and query activity trajectory of the well site worker based on the activity trajectory data of the well site worker stored in the data management platform.

10. The safety management system for well site worker according to claim 9, wherein the data management platform is further configured to store profile information of the well site worker, wherein the positioning tag is in one-to-one correspondence with the profile information of the well site worker.

11. The safety management system for well site worker according to claim 9, wherein the positioning base station is installed on an edge of the well site or an edge of an operation region in the well site, wherein the operation region in the well site comprises the safety region.

12. The safety management system for well site worker according to claim 9, wherein the server is further configured to, when the well site worker is in the buffer region:

acquire a moving speed of the well site worker toward the dangerous region based on the positioning tag;

judge whether the moving speed is greater than a preset threshold; and in response to the moving speed being greater than the preset threshold, send the alarm signal to the well site worker.

13. The safety management system for well site worker according to claim 9, wherein the server is further configured to:

acquire profile information of the well site worker from the data management platform, wherein the profile information of the well site worker comprises authority information of the well site worker;

determine, based on the authority information of the well site worker, whether the alarm signal is triggered when the well site worker is located in the buffer region or the dangerous region; and trigger the alarm signal when the well site worker is located in the buffer region or the dangerous region in response to the well site worker not having an authority to enter the dangerous region.

14. The safety management system for well site worker according to claim 13, wherein the server is further configured to: when the well site worker is located in the dangerous region and has no authority, plan a route for the well site worker to evacuate the dangerous region according to the position information of the well site worker and the layout information of the well site, and send the evacuation route to the positioning tag via the positioning base station.

15. The safety management system for well site worker according to claim 9, wherein the layout information further comprises functional partitioning, safety management level partitioning, a count of positioning base stations, and installation positions of the positioning base stations of the well site;
    wherein the server is further configured to: determine the position information of the safety region, the dangerous region, and the buffer region between the safe region and the dangerous region of the well site according to the functional partitioning and the safety management level partitioning of the well site.

16. The safety management system for well site worker according to claim 9, wherein the server is further configured to:
    acquire a duration when the well site worker is at a same position and a count of well site workers located at the same position based on the positioning tag;
    perform timeout monitoring and motionless monitoring on the well site worker based on the duration when the well site worker is at the same position; and
    perform crowd monitoring on the well site workers based on the count of the well site workers located at the same position.

17. The safety management system for well site worker according to claim 9, wherein the server is further configured to:
    receive alarm information sent by the well site worker through the positioning tag, and judge a dangerous situation according to the alarm information, so as to send a rescue prompt signal to implement a corresponding rescue operation.

18. The safety management system for well site worker according to claim 9, wherein the server is further configured to:
    acquire activity trajectory of the well site worker form the data management platform, so as to perform statistics and query on a behavior of the well site worker.

19. A non-transitory computer-readable storage medium storing instructions that, when executed by a processor, cause the processor to perform operations comprising:
    acquiring, from a positioning tag, position information of a well site worker wearing the positioning tag;
    acquiring layout information of a well site, wherein the layout information comprises position information of a safe region, a dangerous region, and a buffer region between the safe region and the dangerous region in the well site; and
    in response to the well site worker being located in the buffer region or the dangerous region, sending an alarm signal to the positioning tag to trigger an alarm for warning the well site worker to stay away from the dangerous region.

20. The non-transitory computer-readable storage medium according to claim 19, wherein the operations further comprise:
    acquiring a moving speed of the well site worker toward the dangerous region;
    judging whether the moving speed is greater than a preset threshold; and
    in response to the moving speed being greater than the preset threshold, sending the alarm signal to the well site worker.

* * * * *